US012792553B2

(12) United States Patent
Wang et al.

(10) Patent No.: US 12,792,553 B2
(45) Date of Patent: Nov. 10, 2026

(54) HETEROGENEOUS ACCELERATION DEVICE, SYSTEM, METHOD, AND APPARATUS, AND STORAGE MEDIUM

(71) Applicant: Suzhou MetaBrain Intelligent Technology Co., Ltd., Suzhou (CN)

(72) Inventors: Hongliang Wang, Suzhou (CN); Qi Mou, Suzhou (CN); Shengcai Lu, Suzhou (CN); Wei Liu, Suzhou (CN); Rengang Li, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 19/143,865

(22) PCT Filed: Sep. 29, 2024

(86) PCT No.: PCT/CN2024/122130
§ 371 (c)(1),
(2) Date: Jun. 26, 2025

(87) PCT Pub. No.: WO2025/098051
PCT Pub. Date: May 15, 2025

(65) Prior Publication Data

US 2026/0119439 A1 Apr. 30, 2026

(30) Foreign Application Priority Data

Nov. 7, 2023 (CN) ......................... 202311472172.4

(51) Int. Cl.
*G06F 13/42* (2006.01)

(52) U.S. Cl.
CPC .................... *G06F 13/4221* (2013.01); *G06F 2213/0026* (2013.01)

(58) Field of Classification Search
CPC ....................................................... G06F 21/44
See application file for complete search history.

(56) References Cited

U.S. PATENT DOCUMENTS 10,942,716 B1 * 3/2021 Powers ............... G06F 9/45516
2015/0089495 A1 3/2015 Persson et al.
(Continued)

FOREIGN PATENT DOCUMENTS

CN 102012876 A 4/2011
CN 108776649 A 11/2018
(Continued)

OTHER PUBLICATIONS

International Search Report of corresponding PCT application (PCT/CN2024/122130) Jan. 10, 2025, 6 pages.
(Continued)

*Primary Examiner* — Henry Tsai
*Assistant Examiner* — Juanito C Borromeo
(74) *Attorney, Agent, or Firm* — COOPER LEGAL GROUP LLC

(57) ABSTRACT

The present application discloses a heterogeneous acceleration device, system, method, and apparatus, and a storage medium, relates to the technical field of hardware acceleration. The heterogeneous acceleration device includes: a first field programmable gate array (FPGA) and at least one second FPGA. The first FPGA is connected to an upper computer through a peripheral component interface express (PCIe) bus and is configured to: receive first data transmitted by the upper computer and return second data to the upper computer. The first FPGA is connected to the at least one second FPGA through a high-speed transmission device and is configured to: transmit corresponding first data units to each second FPGA and receive second data units returned by each second FPGA.

19 Claims, 7 Drawing Sheets

(56) References Cited

U.S. PATENT DOCUMENTS

| | | | |
|---|---|---|---|
| 2018/0341495 A1 | 11/2018 | Culurciello et al. | |
| 2019/0004847 A1 | 1/2019 | Yang et al. | |
| 2021/0097221 A1 | 4/2021 | Liao et al. | |
| 2022/0334990 A1* | 10/2022 | Karr | G06F 3/0688 |

FOREIGN PATENT DOCUMENTS

| | | |
|---|---|---|
| CN | 115129657 A | 9/2022 |
| CN | 116501688 A | 7/2023 |
| CN | 116860773 A | 10/2023 |
| CN | 116886751 A | 10/2023 |
| CN | 117215989 A | 12/2023 |

OTHER PUBLICATIONS

Written Opinion of International Searching Authority of corresponding PCT application (PCT/CN2024/122130) Jan. 10, 2025, 8 pages.
First Office Action of corresponding CN priority application (CN202311472172.4) May 22, 2024, 7 pages.
Notification to Grant Patent Right for Invention of corresponding CN priority application (CN202311472172.4) Jun. 13, 2024, 2 pages.
Wei, et al., "Design of DMA controller based on PCle BUS", Information Technology No. 04, Full text with English abstract, Apr. 25, 2016, 4 pages.

* cited by examiner

HETEROGENEOUS ACCELERATION DEVICE, SYSTEM, METHOD, AND APPARATUS, AND STORAGE MEDIUM

CROSS-REFERENCE TO RELATED APPLICATION

This application claims priority to Chinese Patent Application No. 202311472172.4, entitled "HETEROGENEOUS ACCELERATION DEVICE, SYSTEM, METHOD, AND APPARATUS, AND STORAGE MEDIUM", filed with the China National Intellectual Property Administration on Nov. 7, 2023, which is incorporated by reference in its entirety.

FIELD

The present application relates to the technical field of hardware acceleration, and in particular, to a heterogeneous acceleration device, system, method, and apparatus, and a storage medium.

BACKGROUND

With the development of computer technology, its data processing capability constantly increases. The computer technology can quickly cope with a demand for a large data amount, such as a high-definition image, a high-bitrate audio, and video data. This processing method usually requires use of a high transistor efficiency device such as a field programmable gate array (FPGA) and an application specific integrated circuit (ASIC) for hardware acceleration, to improve data processing efficiency and reduce a workload of a central processing unit (CPU). However, due to a limitation on a quantity of computer interfaces, it is not feasible to physically connect a plurality of hardware acceleration devices to the CPU simultaneously. However, it is difficult for resources of a single hardware acceleration device to meet a demand for performing simultaneous data acceleration on a plurality of applications, especially for an application scene such as a server that needs to process a large amount of data, which limits data processing efficiency of hardware acceleration.

SUMMARY

The present application uses the following technical solutions:

In a first aspect, a heterogeneous acceleration device is provided, including: a first field programmable gate array (FPGA) and at least one second FPGA,

- where the first FPGA is connected to an upper computer through a peripheral component interface express (PCIe) bus and is configured to: receive first data transmitted by the upper computer and return second data to the upper computer; the first data is data that needs to be accelerated by a heterogeneous acceleration device, and the second data is data obtained after acceleration by the heterogeneous acceleration device;
- the first FPGA is connected to the at least one second FPGA through a high-speed transmission device and is configured to: transmit corresponding first data units to one or more second FPGAs among the at least one second FPGA and receive second data units returned by the one or more second FPGAs among the at least one second FPGA; any one of the at least one second FPGA has at least one acceleration application; the first data units are obtained by splitting the first data; a data type processed by each acceleration application corresponds to a data type of each first data unit; the second data units are data units obtained after corresponding acceleration applications performs heterogeneous acceleration on the first data units; and the second data is obtained after merging the second data units.

Further, in response to the heterogeneous acceleration device enabling a virtualization acceleration function, the first FPGA in the heterogeneous acceleration device to include: a PCIe hard core, a virtual device read-write management module, and at least one first communication module; and

- the second FPGA in the heterogeneous acceleration device is configured to include: a second communication module, a second direct memory access control module, and at least one virtual acceleration application;
- the virtual device read-write management module is configured to: obtain the first data from the PCIe hard core, split the first data into corresponding first data units according to communication identifiers in the first data, transmit the first data units to corresponding first communication modules,
- obtain corresponding second data units from the first communication modules, merge the second data units into corresponding second data, and transmit the corresponding second data to the upper computer;
- each of the at least one first communication module transmits data to at least one second communication module; the first communication module transmits the first data units to corresponding second communication modules according to the communication identifier; and
- the second direct memory access control module obtains the first data units from the second communication modules, transmits the first data units to corresponding virtual acceleration applications according to application identifications in the first data units, receives the second data units returned by the virtual acceleration applications, and transmits the second data units to the corresponding second communication modules.

Further, the virtual device read-write management module includes: a read and split submodule and a merge and write-back submodule;

- the read and split submodule splits the first data into the corresponding first data units according to the communication identifiers in the first data, and transmits the first data units to the corresponding first communication modules; and
- the merge and write-back submodule merges the second data units into the corresponding second data and transmits the corresponding second data to the upper computer.

Further, the virtual device read-write management module further includes a mapping table;

- the mapping table includes a correspondence relationship between the communication identifiers and the at least one first communication module; and the first data units are transmitted to the corresponding first communication modules according to the mapping table.

Further, the first FPGA further includes a first in first out memory; and

- the first in first out memory is arranged between the virtual device read-write management module and a data link of each first communication module and is configured to cache the first data units.

Further, the first FPGA further includes a physical data transmission module, a first direct memory access control module, a physical application module, and a physical management module;

the first direct memory access control module obtains the corresponding first data from the PCIe hard core through the physical data transmission module, and transmits the first data to the physical application module for physical acceleration to obtain the corresponding second data, and the second data is then obtained and transmitted to the PCIe hard core through the physical data transmission module; and the physical management module is configured to monitor a state parameter of the heterogeneous acceleration device; and the state parameter includes: a temperature, power consumption, and a voltage.

Further, in response to the heterogeneous acceleration device disabling a virtualization acceleration function, the first FPGA in the heterogeneous acceleration device is configured to include: a PCIe hard core, a third direct memory access control module, a storage controller, a storage read-write management module, and at least one third communication module;

the second FPGA in the heterogeneous acceleration device is configured to include: a fourth communication module and at least one physical acceleration application;

the third direct memory access control module obtains the first data from the PCIe hard core, transmits the first data to the storage controller, obtains the second data from the storage controller, and transmits the second data to the PCIe hard core;

the storage read-write management module is configured to: obtain the first data from the storage controller, split the first data into the corresponding first data units according to communication identifiers in the first data, transmit the first data units to corresponding third communication modules, obtain the second data units from the third communication modules, merge the second data units into the corresponding second data, and transmit the corresponding second data to the storage controller;

each third communication module of the at least one third communication module transmits data to one corresponding fourth communication module; the third communication module transmits the first data units to the corresponding fourth communication module according to the communication identifier; and the fourth communication module transmits the first data units to corresponding physical acceleration applications, receives second data units returned by the physical acceleration applications, and transmits the second data units to the corresponding third communication modules.

Further, in response to the second FPGA including one physical acceleration application, the fourth communication module is in communicative connection with the physical acceleration application; and the fourth communication module transmits the first data units to the physical acceleration application and receives the second data units from the physical acceleration application.

Further, in response to the second FPGA including a plurality of data acceleration applications, the second FPGA further includes a split and merge management module; and the split and merge management module obtains the first data units from the fourth communication module, allocates the first data units to corresponding physical acceleration applications according to application identifications of the first data units, obtains the second data units from the physical acceleration applications, and transmits the second data units to the fourth communication module.

Further, the storage read-write management module includes: a read-out and split submodule and a merge and write-in submodule;

the read-out and split submodule obtains the first data from the storage controller, splits the first data into the corresponding first data units according to the communication identifiers in the first data, and transmits the first data units to the corresponding third communication modules; and the merge and write-in submodule obtains the second data units from the third communication modules, merges the second data units into the corresponding second data, and transmits the corresponding second data to the storage controller.

Further, the first FPGA further includes a data acceleration application; and the data acceleration application obtains the first data units from the read-out and split submodule, performs heterogeneous acceleration on the first data units, and transmits the corresponding second data units to the merge and write-in submodule.

In a second aspect, a heterogeneous acceleration system is provided, including an upper computer and the heterogeneous acceleration device as described in the first aspect;

the upper computer includes: an application driver module and an application interface module;

the application driver module is configured to: configure registers of a virtual acceleration application, a physical acceleration application, and a data acceleration application, and control the virtual acceleration application, the physical acceleration application, and the data acceleration application through the application interface module.

In a third aspect, a heterogeneous acceleration method is provided, applied to the first FPGA in the heterogeneous acceleration system as described in the second aspect and including:

obtaining first data from the upper computer, where the first data is data that needs to be accelerated by the heterogeneous acceleration device;

splitting the first data into first data units according to communication identifiers in the first data, and transmitting the first data units to corresponding second FPGAs;

obtaining second data units from one or more second FPGAs among the at least one second FPGA, where the second data units are results obtained by processing the first data units through corresponding data acceleration applications; and merging the second data units into second data, and returning the second data to the upper computer.

Further, the transmitting the first data units to corresponding second FPGAs includes:

querying first communication modules corresponding to communication identifiers of the first data units in a mapping table, where the communication identifiers include the first communication modules corresponding to the first data units;

obtaining resource utilization rates of second FPGAs corresponding to the first communication modules; and transmitting the first data units to second FPGAs with lowest resource utilization rates.

Further, the first data units are transmitted to the corresponding first communication modules after being cached through the first in first out memory; and the second data units are transmitted to the virtual device read-write management module after being cached through the first in first out memory.

Further, the merging the second data units into second data includes:

preferentially merging second data units with high service priorities according to service priorities of the second data units.

In a fourth aspect, a heterogeneous acceleration method is provided, applied to the second FPGA in the heterogeneous acceleration system as described in the second aspect and including:

obtaining a first data unit transmitted by the first FPGA, where the first data unit includes an application identification;

allocating the first data unit to a corresponding virtual acceleration application for acceleration processing according to the application identification, and obtaining a corresponding second data unit, where the second data unit is a result obtained by processing the first data unit through a corresponding data acceleration application; and transmitting the second data unit to the first FPGA through a corresponding second communication module.

In a fifth aspect, a heterogeneous acceleration method is provided, applied to the upper computer in the heterogeneous acceleration system as described in the second aspect and including:

activating a single root input/output virtualization function of a driver program, where the driver program is used for driving a virtual acceleration application in a second FPGA;

opening and controlling the virtual acceleration application, storing data that requires heterogeneous acceleration as first data into an internal memory of the upper computer, for the first FPGA to obtain the first data; and obtaining second data returned by the first FPGA, where the second data corresponds to the first data, and is obtained by the following method:

transmitting first data units to corresponding virtual acceleration applications for acceleration processing according to application identifications to obtain corresponding second data units, transmitting the second data units to the first FPGA through corresponding second communication modules, obtaining, by the second FPGA, the second data units corresponding to the first data units, and merging the second data units into the second data.

Further, before the activating a single root input/output virtualization function of a driver program, the method further includes:

in response to a heterogeneous acceleration device enabling a virtualization acceleration function, configuring the first FPGA in the heterogeneous acceleration device to include: a PCIe hard core, a virtual device read-write management module, and at least one first communication module; and configuring the second FPGA in the heterogeneous acceleration device to include: a second communication module, a second direct memory access control module, and at least one virtual acceleration application.

In a sixth aspect, a heterogeneous acceleration apparatus is provided, including:

an acceleration data obtaining module, configured to obtain first data from an upper computer, where the first data is data that needs to be accelerated by a heterogeneous acceleration device;

a data splitting and transmission module, configured to: split the first data into first data units according to communication identifiers in the first data, and transmit the first data units to corresponding second FPGAs;

a data acquisition module, configured to obtain second data units from one or more second FPGAs among at least one second FPGA, where the second data units are results obtained by processing the first data units through corresponding data acceleration applications; and a data merging module, configured to: merge the second data units into second data, and return the second data to the upper computer.

In a seventh aspect, one or more non-volatile computer-readable storage media is provided, having a computer-readable instruction stored therein, where the computer-readable instruction, when executed by one or more processors, causes the one or more processors to implement the heterogeneous acceleration methods as described in the third, fourth, and fifth aspects.

In an eighth aspect, a server is provided. When the server executes a computer-readable instruction, the server implements the heterogeneous acceleration methods as described in the third, fourth, and fifth aspects.

BRIEF DESCRIPTION OF THE DRAWINGS

For clearer descriptions of the technical solutions according to the embodiments of the present application, the drawings required to be used in the description of the embodiments are briefly introduced below. It is obvious that the drawings in the description below are only some embodiments of the present application, and it is obvious for those skilled in the art that other drawings can be acquired according to the drawings without creative efforts.

DETAILED DESCRIPTION

Figure 1:
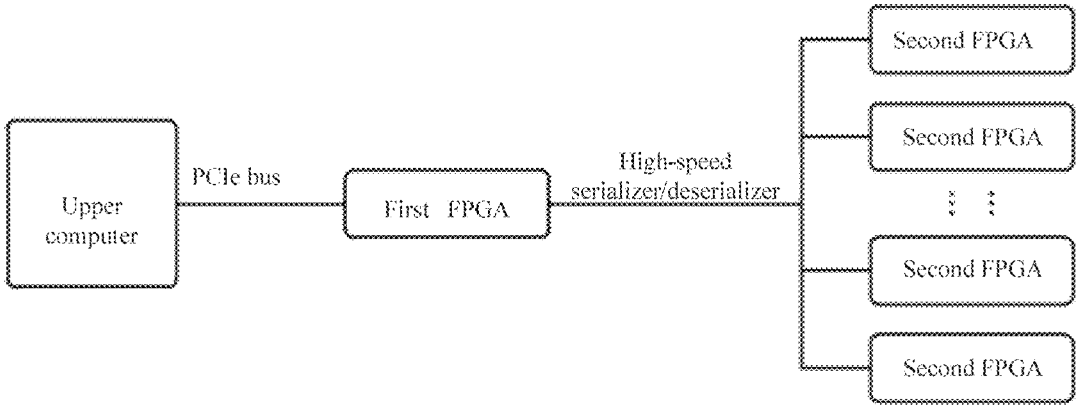
FIG. 1 is a schematic diagram of a heterogeneous acceleration device according to one or more embodiments of the present application.

To make the objectives, technical solutions, and advantages of the present application clearer, the technical solutions in the implementations of the present application are clearly and completely described below with reference to the accompanying drawings in the implementations of the present application. Apparently, the described implementations are merely some rather than all of the embodiments of the present application. All other embodiments obtained by a person of ordinary skill in the art based on the embodiments of the present application without making creative efforts shall fall within the protection scope of the present application.

Unless otherwise defined, technical or scientific terms used in the present application should have the ordinary meanings as understood by those of ordinary skill in the art to which the present application belongs. The terms "first", "second", and the like used in the present application do not indicate any order, quantity, or importance, but are only used to distinguish different components. Similarly, the term "one", "a/an", or the like does not indicate a quantity limit, but rather indicate at least one. The numbering in the accompanying drawings of this specification only indicates distinguishing between various functional components or modules, and does not represent logical relationships between the components or modules. The term "include", "contain", or another other similar term means that the elements or objects stated before them encompass the elements or objects and equivalents thereof listed after them, but do not exclude other elements or objects. The term such as "connect" or "connection" is not limited to physical or mechanical connection, but can include electrical connection, whether direct or indirect. The terms "upper", "lower", "left", "right", and the like are merely used to indicate relative positional relationships. After the absolute position of a described object changes, the relative positional relationship may alternatively change accordingly.

The various embodiments of the present application will be described in detail below with reference to the accompanying drawings. It should be noted that in the accompanying drawings, the same reference numerals are assigned to components that have essentially the same or similar structures and functions, and repeated descriptions about them will be omitted.

In the existing art, there is a contradiction that due to a limitation of a quantity of computer hardware interfaces, a processor cannot be physically connected to a large number of hardware acceleration resources, and cannot meet a demand for simultaneously performing hardware acceleration on data of a plurality of applications. The present application expands hardware acceleration devices based on a PCIe and an I/O virtualization technology, so as to meet the demand for simultaneously performing hardware acceleration on a plurality of applications in a case of limited computer physical interfaces.

In some embodiments, a heterogeneous acceleration device is provided, as shown in FIG. 1, including: a first FPGA and at least one second FPGA, where the first FPGA is connected to an upper computer through a peripheral component interface express (PCIe) bus and is configured to: receive first data transmitted by the upper computer and return second data to the upper computer; the first data is data that needs to be accelerated by a heterogeneous acceleration device, and the second data is data obtained after acceleration by the heterogeneous acceleration device;

the first FPGA is connected to the at least one second FPGA through a high-speed transmission device and is configured to: transmit corresponding first data units to one or more second FPGAs among the at least one second FPGA and receive second data units returned by the one or more second FPGAs among the at least one second FPGA; any one of the at least one second FPGA has at least one acceleration application; the first data units are obtained by splitting the first data; a data type processed by each acceleration application corresponds to a data type of each first data unit; the second data units are data units obtained after corresponding acceleration applications performs heterogeneous acceleration on the first data units; and the second data is obtained after merging the second data units.

A hardware acceleration technology means a technology of allocating computationally intensive tasks to specialized hardware in a computer to reduce a workload of a central processing unit. Common hardware acceleration devices include a graphics processing unit (GPU), a field programmable gate array (FPGA), an application specific integrated circuit (ASIC), and the like. An FPGA chip and an ASIC chip can directly implement algorithms through a transistor gate circuit. Compared with an instruction system of the GPU, algorithms can be built directly on physical structures without intermediate layers, thereby achieving high transistor efficiency. The hardware acceleration devices are suitable for hardware acceleration without considering energy consumption.

The FPGA has an on-site programmable function, which can instruct reconstructed devices to be connected according to a program and is applicable to switching between enabling and disabling of a virtualization function. The present application does not limit specific model numbers of a first acceleration device and a second acceleration device.

The first FPGA and each second FPGA may be arranged on a printed circuit board (PCB). The PCB is provided with a gold finger connector to connect the first FPGA to a peripheral component interconnect express (PCIe) bus. The PCIe bus is further connected to the upper computer. Data transmission between a hardware accelerator and the upper computer is achieved through the PCIe bus.

The first FPGA and each second FPGA are connected through a high-speed transmission device. A bandwidth of the high-speed transmission device is greater than a data processing bandwidth of an FPGA. Alternatively, the high-speed transmission device is a high-speed serializer/deserializer (SERDES).

Alternatively, each second FPGA may be configured to include at least one acceleration application. Each acceleration application can perform hardware acceleration on data or data units of corresponding data types. Each acceleration application may be configured as a virtual acceleration application or a physical acceleration application as needed. Hardware acceleration performed on the first data units may be implemented through a physical acceleration application of an FPGA, or through a virtual acceleration application of a virtualized FPGA. The virtual acceleration application or the physical acceleration application may be selected and configured as needed.

The first data is data that needs to be accelerated by the heterogeneous acceleration device. The first data transmitted to the first FPGA through the PCIe bus is large bit width serial data, and an acceleration application cannot directly process the large bit width serial data. The first FPGA splits the first data into a plurality of first data units and transmits all the first data units to second FPGAs in which corresponding acceleration applications are located for acceleration. By adding communication identifiers in the first data units, the first data units can correspond to the corresponding second FPGAs, and the second FPGAs contain acceleration applications for processing corresponding data types.

The second FPGAs use the accelerated first data units as second data units and return the second data units to the first FPGA. The first FPGA then merges the second data units into second data. The second data is large bit width serial data and is transmitted to the upper computer through the PCIe bus to complete data acceleration.

Figure 2:
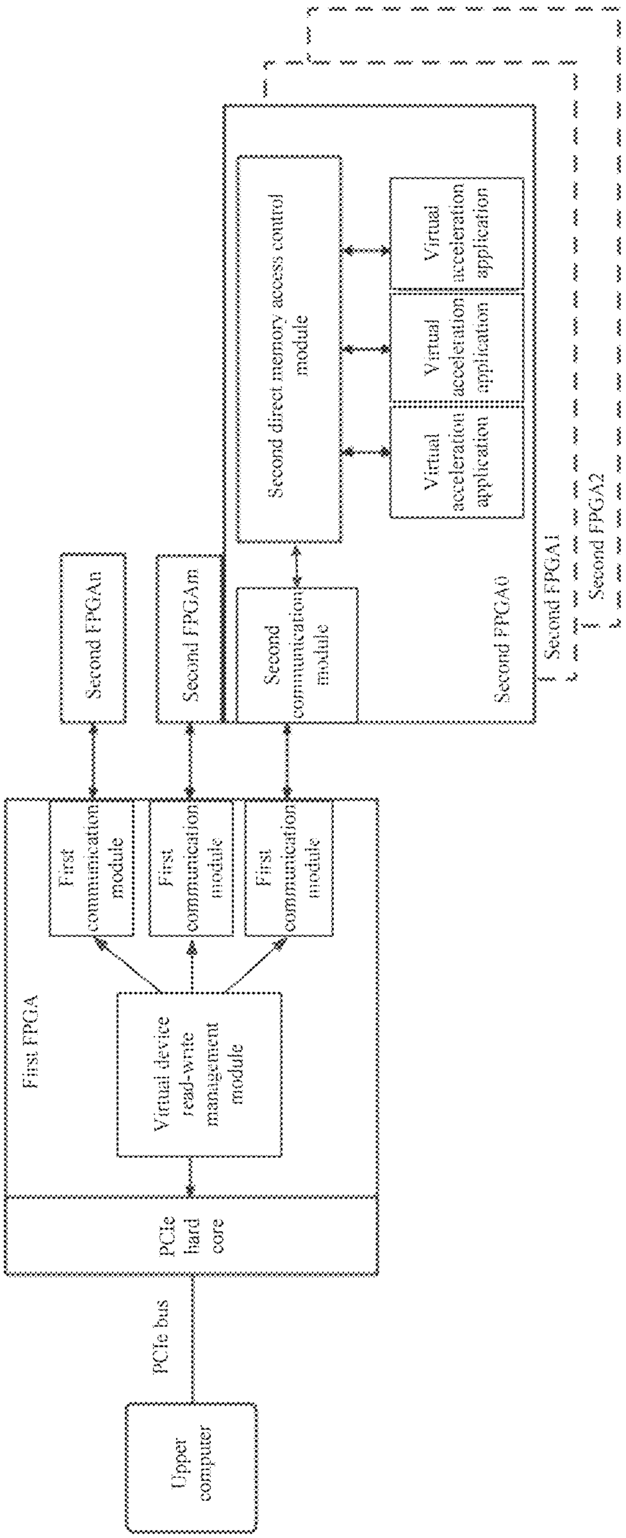
FIG. 2 is a schematic diagram of module configuration of a virtualized heterogeneous acceleration device according to one or more embodiments of the present application.

In response to the heterogeneous acceleration device enabling a virtualization acceleration function, as shown in FIG. 2, the first FPGA in the heterogeneous acceleration device is configured to include: a PCIe hard core, a virtual device read-write management module, and at least one first communication module, and the second FPGA in the heterogeneous acceleration device is configured to include: a second communication module, a second direct memory access control module, and at least one virtual acceleration application.

The virtual device read-write management module is configured to: obtain the first data from the PCIe hard core, split the first data into corresponding first data units according to communication identifiers in the first data, transmit the first data units to corresponding first communication modules, obtain corresponding second data units from the first communication modules, merge the second data units into corresponding second data, and transmit the corresponding second data to the upper computer.

Each of the at least one first communication module transmits data to at least one second communication module; the first communication module transmits the first data units to corresponding second communication modules according to the communication identifier.

The second direct memory access control module obtains the first data units from the second communication modules, transmits the first data units to corresponding virtual acceleration applications according to application identifications in the first data units, receives the second data units returned by the virtual acceleration applications, and transmits the second data units to the corresponding second communication modules.

Data transmission between the first FPGA and each second FPGA is completed by cooperation between each first communication module and the second communication module. The first communication module is connected to the second communication module through a serializer/deserializer. In FIG. 2, second FPGA0, second FPGA1, second FPGA2, second FPGAm, and second FPGAn are configured to illustrate serial numbers of the second FPGAs.

Alternatively, the first communication module and the second communication module are media access control (MAC) modules. An MAC module is a hard core module of an FPGA, which is configured to perform high-speed series-parallel conversion and perform encoding and decoding on a data link. For users, this module provides a standard AXI-Steam interface for data transmission.

The virtual device read-write management module is responsible for reading data from an off-chip storage device (usually a double data rate (DDR)) or an on-chip storage device (usually a random access memory (RAM)). After the large bit width serial data is converted into the first data units, the first data units transmitted to the corresponding first communication modules according to the communication identifiers carried by the first data units. The first data units further carry application identifications, whereby the second FPGAs may allocate the first data units to the corresponding virtual acceleration applications according to the application identifications.

In the first data, the communication identifiers are signs for splitting of the first data units, and are also signs for transmission of the split first data units to which second FPGAs. After the first data is split into the first data units according to the communication identifiers, the first data units are transmitted one by one to the second FPGAs according to the communication identifiers. The corresponding second FPGAs have the virtual acceleration applications that process the corresponding first data units. The virtual acceleration applications accelerate the corresponding first data units to obtain the corresponding second data units. The second data units are transmitted to the corresponding first communication modules through the corresponding second communication modules. After receiving the second data units, the first FPGA merges the second data units into the second data and transmits the second data units to the upper computer.

Figure 3:
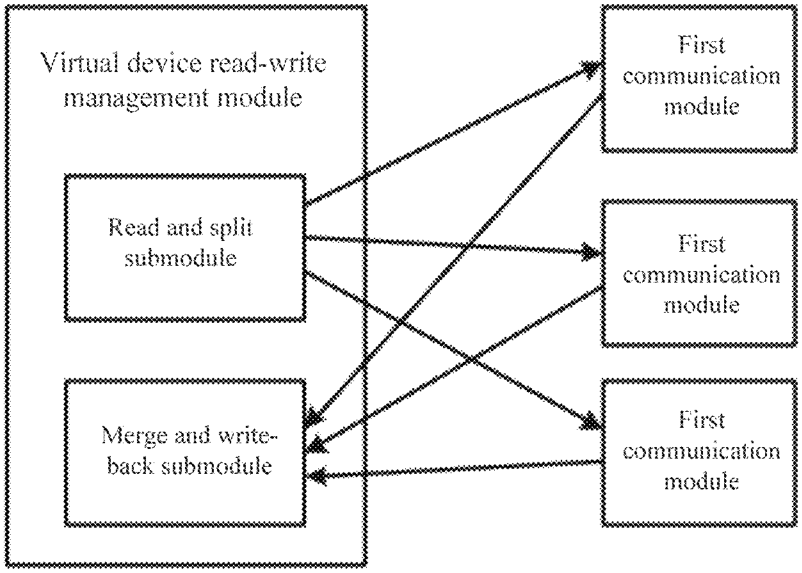
FIG. 3 is a schematic diagram of a virtual device read-write management module according to one or more embodiments of the present application.

In some embodiments, as shown in FIG. 3, the virtual device read-write management module includes: a read and split submodule and a merge and write-back submodule.

The read and split submodule splits the first data into the corresponding first data units according to the communication identifiers in the first data, and transmits the first data units to the corresponding first communication modules; and The merge and write-back submodule merges the second data units into the corresponding second data and transmits the corresponding second data to the upper computer.

In order to distinguish a module that allocates the first data units from a module that merges the second data units in virtualized and non-virtualized states, a module that splits the first data in the virtualized state is named as read and split submodule, and a module that merges the second data units in the virtualized state is named as merge and write-back submodule. A module that splits the first data in the non-virtualized state is named as read-out and split submodule, and a module that merges the second data units in the non-virtualized state is named as merge and write-in module.

The virtual device read-write management module manages and operates relevant registers. The read and split submodule reads data, including: reading an initial address, reading a data length, reading a communication identifier, reading an application identification, starting to read, and the like. The merge and write-back submodule writes data, including: writing an initial address, writing a data length, writing a communication identifier, writing an application identification, starting to write, and the like.

Figure 4:
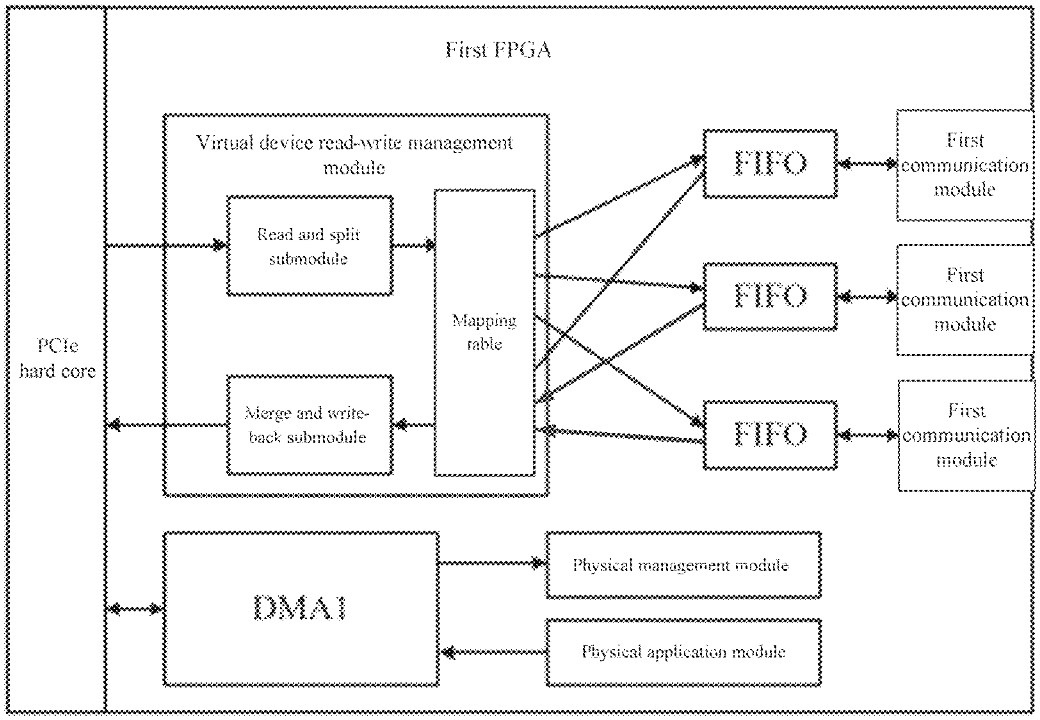
FIG. 4 is a schematic diagram of a first FPGA module according to one or more embodiments of the present application.

Alternatively, as shown in FIG. 4, the virtual device read-write management module further includes a mapping table.

The mapping table includes a correspondence relationship between the communication identifiers and the at least one first communication module; and the first data units are transmitted to the corresponding first communication modules according to the mapping table.

The mapping table stores data types of the first data units and the first communication modules that should receive the first data units. The virtual acceleration applications for processing the first data units are in the second FPGAs. Due to a one-to-one correspondence relationship between the second communication modules in the second FPGAs and the first communication modules in the first FPGA, when the first communication modules that receive the first data units, the second FPGAs that processes the first data units are determined.

The heterogeneous acceleration device includes at least one second FPGA, and at least one virtual acceleration application is configured in each second FPGA. Corresponding to a data type, there may be a plurality of second FPGAs with virtual acceleration applications that process the data type. In this architecture, by querying the mapping table, a second FPGA that is free and that has a virtual acceleration application capable of processing the corresponding data type can be found to perform hardware acceleration on the first data units of the corresponding data type, thus improving hardware acceleration processing efficiency.

To update the mapping table, it needs to ensure that all operations are completed and paused, otherwise it will cause the bus to hang up.

Alternatively, as shown in FIG. 4, the first FPGA further includes a first in first out memory.

The first in first out memory is arranged between the virtual device read-write management module and a data link of each first communication module and is configured to cache the first data units.

By arranging the first in first out (FIFO) memory between the storage read-write management module and the data links of the first communication modules, efficiency of transmitting the first data units from the virtual device read-write management module to the corresponding first communication modules can be improved. The allocation of the first data units occurs in sequence: namely, a next first data unit is transmitted after transmission of a previous data unit is completed. Therefore, when the transmission of the previous first data unit becomes congested, the next first data unit cannot be transmitted. By caching the first data units in the first in first out memory, distribution efficiency of the first data units can be improved, and data congestion can be avoided. The same applies to receiving of the second data units, which will not be further elaborated here.

Alternatively, as shown in FIG. 4, the first FPGA further includes a physical data transmission module, a first direct memory access control module (which is represented as DMA1 in FIG. 4), a physical application module, and a physical management module.

The first direct memory access control module obtains the corresponding first data from the PCIe hard core through the physical data transmission module, and transmits the first data to the physical application module for physical acceleration to obtain the corresponding second data, and the second data is then obtained and transmitted to the PCIe hard core through the physical data transmission module.

The physical management module is configured to monitor a state parameter of the heterogeneous acceleration device; and the state parameter includes: a temperature, power consumption, and a voltage.

The first acceleration device further includes a PCIe hard core module. The PCIe hard core module supports a single root input/output virtualization characteristic, to receive the first data and return the second data.

For an FPGA, its PCIe hard core module (Hard IP) needs to support a single root input/output virtualization (SRIOV) characteristic. A PCIe hard core does not need to enable a single root input/output virtualization option and does not need to support virtualization, which means that the upper computer can only see one physical device and no virtual device. In virtualization, the PCIe hard core provides communication identifiers. During splitting of the first data, the first data is split according to the communication identifiers. In a non-virtualized case, software and hardware coordination is required. The upper computer adds a private identification into a data packet transmitted through the PCIe, and the read and split submodule analyzes the data packet and determines, according to the identification, which first communication module the data packet is transmitted to. On the contrary, the merge and write-back submodule does not need to determine, according to the identification, how to perform merging.

The second acceleration device further includes a second direct memory access control module.

The second direct memory access control module is configured to: allocate, according to data types, the first data units obtained by the second communication modules to the corresponding data acceleration applications for hardware acceleration, and return the second data units obtained after the hardware acceleration is completed to the second communication modules.

Correspondingly, in response to the heterogeneous acceleration device enabling the virtualization acceleration function, the upper computer includes: an application driver module and an application interface module.

The application driver module is configured to: configure registers of the corresponding data acceleration applications, and control the data acceleration applications through the application interface module.

Due to different virtual acceleration applications, each virtual acceleration application has a one-to-one correspondence upper computer control program, and the control program is saved in the application driver module to perform configuration and data processing on the register of the corresponding data acceleration application. A main application program in the application driver module controls the data acceleration applications through the application interface module, and also controls a direct memory access control module and a storage register management module, thereby controlling data movement and controlling data scheduling between the first FPGA and each second FPGA. In a case of surplus resources in the first FPGA, data can also be scheduled to the physical application module in the first FPGA, without the first communication module.

Figure 5:
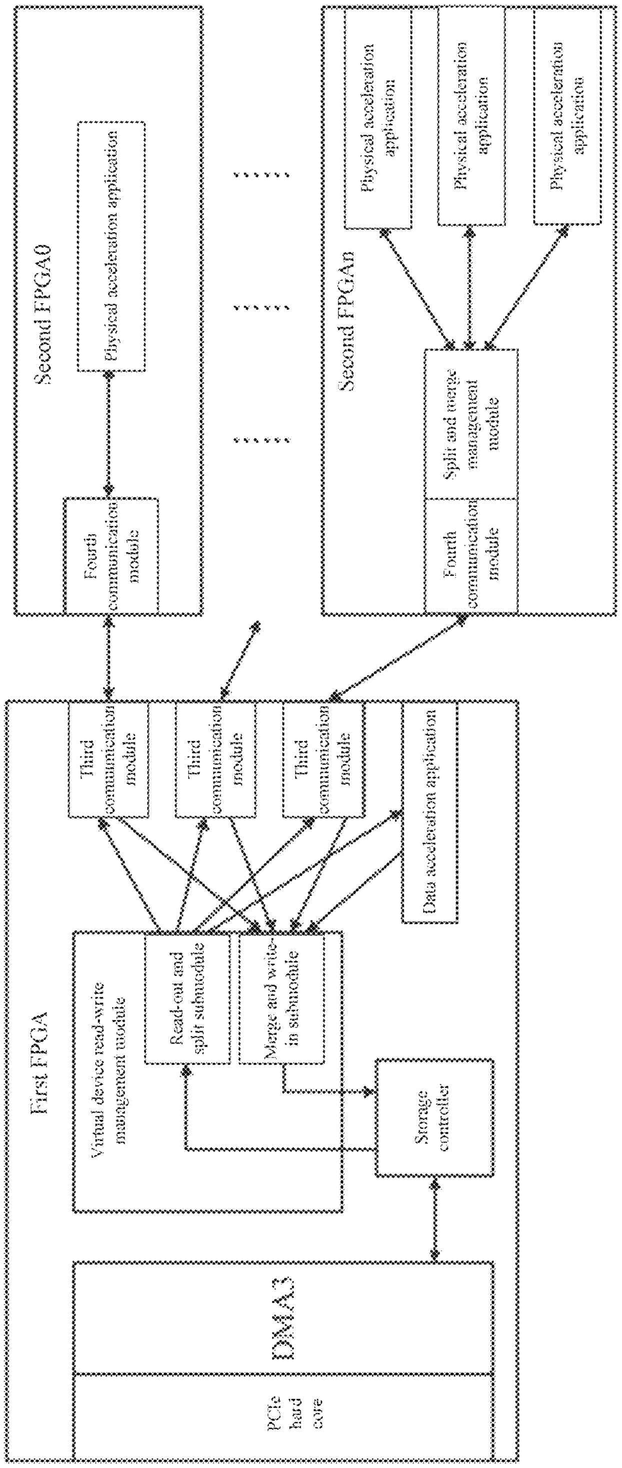
FIG. 5 is a schematic diagram of module configuration of a non-virtualized heterogeneous acceleration device according to one or more embodiments of the present application.

In response to the heterogeneous acceleration device disabling a virtualization acceleration function, as shown in FIG. 5, the first FPGA in the heterogeneous acceleration device is configured to include: a PCIe hard core, a third direct memory access control module, a storage controller, a storage read-write management module, and at least one third communication module.

The second FPGA in the heterogeneous acceleration device is configured to include: a fourth communication module at least one physical acceleration application.

The third direct memory access control module obtains the first data from the PCIe hard core, transmits the first data to the storage controller, obtains the second data from the storage controller, and transmits the second data to the PCIe hard core.

The storage read-write management module is configured to: obtain the first data from the storage controller, split the first data into the corresponding first data units according to communication identifiers in the first data, transmit the first data units to corresponding third communication modules, obtain the second data units from the third communication modules, merge the second data units into the corresponding second data, and transmit the corresponding second data to the storage controller.

Each third communication module of the at least one third communication module transmits data to one corresponding fourth communication module; the third communication module transmits the first data units to the corresponding fourth communication module according to the communication identifier.

The fourth communication module transmits the first data units to corresponding physical acceleration applications, receives second data units returned by the physical acceleration applications, and transmits the second data units to the corresponding third communication modules.

Alternatively, in response to the second FPGA including one physical acceleration application, the fourth communication module is in communicative connection with the physical acceleration application.

The fourth communication module transmits the first data units to the physical acceleration application and receives the second data units from the physical acceleration application.

Alternatively, in response to the second FPGA including a plurality of data acceleration applications, the second FPGA further includes a split and merge management module. The split and merge management module obtains the first data units from the fourth communication module, allocates the first data units to corresponding physical acceleration applications according to application identifications of the first data units, obtains the second data units from the physical acceleration applications, and transmits the second data units to the fourth communication module.

In some embodiments, the storage read-write management module includes: a read-out and split submodule and a merge and write-in submodule.

The read-out and split submodule obtains the first data from the storage controller, splits the first data into the corresponding first data units according to the communication identifiers in the first data, and transmits the first data units to the corresponding third communication modules.

The merge and write-in submodule obtains the second data units from the third communication modules, merges the second data units into the corresponding second data, and transmits the corresponding second data to the storage controller.

Further, the first FPGA further includes a data acceleration application.

The data acceleration application obtains the first data units from the read-out and split submodule, performs heterogeneous acceleration on the first data units, and transmits the corresponding second data units to the merge and write-in submodule.

The first FPGA further includes a storage controller. The first FPGA stores, through the storage controller, data in a double data rate synchronous dynamic random access memory (DDR SDRAM) granule serving as an off-chip storage device or in a random access memory (RAM) serving as an on-chip storage device.

The first FPGA further includes a storage register management module configured to manage a one-to-one correspondence relationship between the registers and BAR spaces of the upper computer.

The storage read-write management module manages and operates relevant registers. The read and split submodule reads data, including: reading an initial address, reading a data length, reading a communication identifier, reading an application identification, starting to read, and the like. The merge and write-back submodule writes data, including: writing an initial address, writing a data length, writing a communication identifier, writing an application identification, starting to write, and the like.

The first FPGA further includes an application register management module configured to convert register operations on the data acceleration applications in the second FPGAs configured in the upper computer into custom packet protocols that correspond to the second FPGAs through the communication identifiers and that correspond to the data acceleration applications through the application identifications. Two types of operations, namely register read and register write, are performed on a custom packet. For register write, a packet does not need to be returned. For register read, the applications need to return read data, and the read data needs to be returned to the upper computer through the application register management module.

In some other embodiments, a heterogeneous acceleration system is provided, including an upper computer and the heterogeneous acceleration device as described in the first aspect.

The upper computer includes: an application driver module and an application interface module.

The application driver module is configured to: configure registers of a virtual acceleration application, a physical acceleration application, and a data acceleration application, and control the virtual acceleration application, the physical acceleration application, and the data acceleration application through the application interface module.

Due to different virtual acceleration applications, each virtual acceleration application has a one-to-one correspondence upper computer control program, and the control program is saved in the application driver module to perform configuration and data processing on the register of the corresponding data acceleration application. A main application program in the application driver module controls the data acceleration applications through the application interface module, and also controls a direct memory access control module and a storage register management module, thereby controlling data movement and controlling data scheduling between the first FPGA and each second FPGA. In a case of surplus resources in the first FPGA, data can also be scheduled to the physical application module in the first FPGA, without the first communication module.

Figure 6:
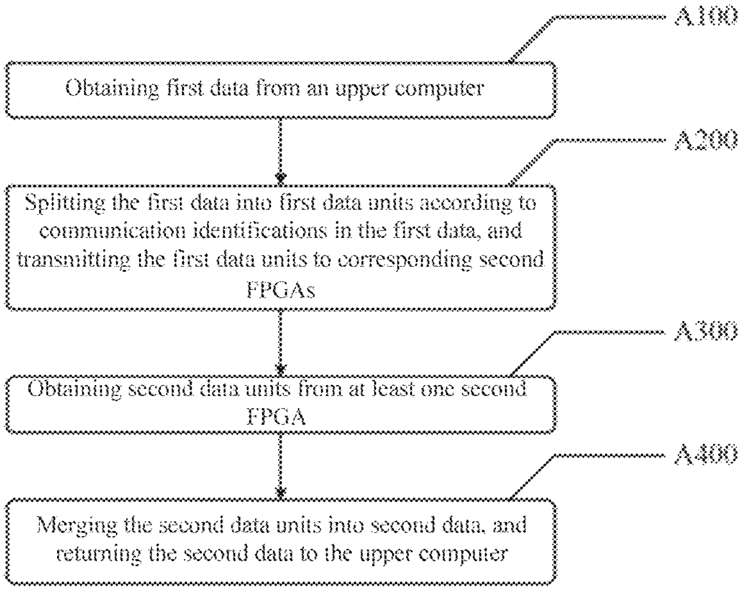
FIG. 6 is a schematic diagram of a heterogeneous acceleration method of a first FPGA in a heterogeneous acceleration system according to one or more embodiments of the present application.

In some other embodiments, as shown in FIG. 6, a heterogeneous acceleration method is provided, applied to the first FPGA in the heterogeneous acceleration system as described in the second aspect and including:

- A100: Obtaining first data from the upper computer, where the first data is data that needs to be accelerated by the heterogeneous acceleration device.
- A200: Splitting the first data into first data units according to communication identifiers in the first data, and transmitting the first data units to corresponding second FPGAs.
- A300: Obtaining second data units from one or more second FPGAs among the at least one second FPGA, where the second data units are results obtained by processing the first data units through corresponding data acceleration applications.
- A400: Merging the second data units into second data, and returning the second data to the upper computer.

In some other embodiments, the transmitting the first data units to corresponding second FPGAs includes:

- A210: Querying first communication modules corresponding to communication identifiers of the first data units in a mapping table, where the communication identifiers include the first communication modules corresponding to the first data units.

A220: Obtaining resource utilization rates of second FPGAs corresponding to the first communication modules.

A230: Transmitting the first data units to second FPGAs with lowest resource utilization rates.

Alternatively, the first data units are transmitted to the corresponding first communication modules after being cached through the first in first out memory, and the second data units are transmitted to the virtual device read-write management module after being cached through the first in first out memory.

Alternatively, the merging the second data units into second data includes:

preferentially merging second data units with high service priorities according to service priorities of the second data units.

In some other embodiments, a heterogeneous acceleration method is provided, applied to the second FPGA in the heterogeneous acceleration system as described in the second aspect and including:

B100: Obtaining a first data unit transmitted by the first FPGA, where the first data unit includes an application identification.

B200: Allocating the first data unit to a corresponding virtual acceleration application for acceleration processing according to the application identification, and obtaining a corresponding second data unit, where the second data unit is a result obtained by processing the first data unit through a corresponding data acceleration application.

B300: Transmitting the second data unit to the first FPGA through a corresponding second communication module.

In some other embodiments, a heterogeneous acceleration method is provided, applied to the upper computer in the heterogeneous acceleration system as described in the second aspect and including:

C100: Activating a single root input/output virtualization function of a driver program, where the driver program is used for driving a virtual acceleration application in a second FPGA.

C200: Opening and controlling the virtual acceleration application, and storing data that requires heterogeneous acceleration as first data into an internal memory of the upper computer, for the first FPGA to obtain the first data.

C300: Obtaining second data returned by the first FPGA, where the second data corresponds to the first data, and is obtained by the following method:

transmitting first data units to corresponding virtual acceleration applications for acceleration processing according to application identifications to obtain corresponding second data units, transmitting the second data units to the first FPGA through corresponding second communication modules, obtaining, by the second FPGA, the second data units corresponding to the first data units, and merging the second data units into the second data.

Before the activating a single root input/output virtualization function of a driver program, the method further includes:

S010: In response to a heterogeneous acceleration device enabling a virtualization acceleration function, configuring the first FPGA in the heterogeneous acceleration device to include: a PCIe hard core, a virtual device read-write management module, and at least one first communication module.

S020: Configuring the second FPGA in the heterogeneous acceleration device to include: a second communication module, a second direct memory access control module, and at least one virtual acceleration application.

It is understood that although all the steps in the flowchart of FIG. 6 are displayed in sequence according to the instructions of the arrows, these steps are not necessarily performed in sequence according to the sequence indicated by the arrows. Unless otherwise explicitly specified in the present disclosure, execution of the steps is not strictly limited, and the steps may be performed in other sequences. Moreover, at least some of the steps in FIG. 6 may include a plurality of substeps or a plurality of stages. These substeps or stages are not necessarily performed at the same moment but may be performed at different moments. Execution of these substeps or stages is not necessarily performed in sequence, but may be performed in turn or alternately with other steps or substeps in other steps or at least some of the stages.

Figure 7:
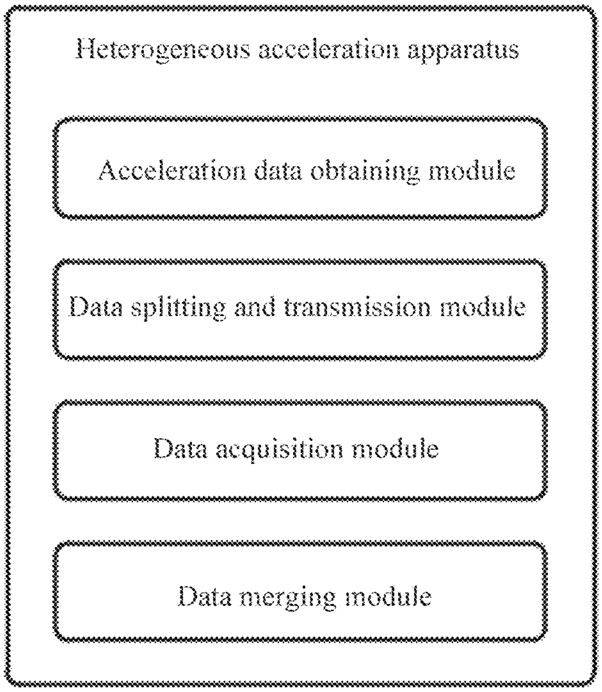
FIG. 7 is a schematic diagram of a heterogeneous acceleration apparatus according to one or more embodiments of the present application.

In some other embodiments, a heterogeneous acceleration apparatus, as shown in FIG. 7, includes:

an acceleration data obtaining module, configured to obtain first data from an upper computer, where the first data is data that needs to be accelerated by a heterogeneous acceleration device;

a data splitting and transmission module, configured to: split the first data into first data units according to communication identifiers in the first data, and transmit the first data units to corresponding second FPGAs;

a data acquisition module, configured to obtain second data units from one or more second FPGAs among at least one second FPGA, where the second data units are results obtained by processing the first data units through corresponding data acceleration applications; and a data merging module, configured to: merge the second data units into second data, and return the second data to the upper computer.

The specific limitations on the heterogeneous acceleration apparatus can be found in the limitations on the heterogeneous acceleration method described above, and will not be elaborated here. The modules in the heterogeneous acceleration apparatus may be implemented entirely or partially through software, hardware, or a combination thereof. The foregoing modules may be built in or independent of a processor of a computer device in a form of hardware, or may be stored in a memory of the computer device in a form of software, for the processor to invoke to execute operations corresponding to the foregoing modules.

In some other embodiments, a computer-readable storage medium is provided, having a computer-readable instruction stored thereon. The computer-readable instruction, when executed by a processor, implements the heterogeneous acceleration methods as described in the third, fourth, and fifth aspects. The heterogeneous acceleration methods will not be elaborated here.

In some other embodiments, a server is provided. When the server executes a computer-readable instruction, the server implements the heterogeneous acceleration methods as described in the third, fourth, and fifth aspects. The heterogeneous acceleration methods will not be elaborated here.

By implementing the heterogeneous acceleration device, system, method, and apparatus, and the storage medium that are disclosed by the embodiments of the present application, a plurality of hardware acceleration devices can be expanded through a hardware interface, whereby a quantity of hardware interfaces is reduced, and supplying of hardware acceleration resources is met. Hardware resources of the hardware acceleration devices are fully used, whereby the hardware acceleration devices fully accommodate data acceleration applications; congestion in data transmission of the hardware acceleration devices is avoided; and data transmission efficiency is improved.

All the optional technical solutions mentioned above can be combined in any way to form the optional embodiments of the present application, and will not be elaborated here.

Embodiment I

With reference to FIG. 1, the following illustrates a heterogeneous acceleration device, including:

a first FPGA and at least one second FPGA, where the first FPGA is connected to an upper computer through a peripheral component interface express (PCIe) bus and is configured to: receive first data transmitted by the upper computer and return second data to the upper computer; the first data is data that needs to be accelerated by a heterogeneous acceleration device, and the second data is data obtained after acceleration by the heterogeneous acceleration device;

the first FPGA is connected to the at least one second FPGA through a high-speed transmission device and is configured to: transmit corresponding first data units to one or more second FPGAs among the at least one second FPGA and receive second data units returned by the one or more second FPGAs among the at least one second FPGA; any one of the at least one second FPGA has at least one acceleration application; the first data units are obtained by splitting the first data; a data type processed by each acceleration application corresponds to a data type of each first data unit; the second data units are data units obtained after corresponding acceleration applications performs heterogeneous acceleration on the first data units; and the second data is obtained after merging the second data units.

Embodiment II

Based on Embodiment I, in response to the heterogeneous acceleration device enabling a virtualization acceleration function, the first FPGA in the heterogeneous acceleration device is configured to include: a PCIe hard core, a virtual device read-write management module, and at least one first communication module; and the second FPGA in the heterogeneous acceleration device is configured to include: a second communication module, a second direct memory access control module, and at least one virtual acceleration application.

The virtual device read-write management module is configured to: obtain the first data from the PCIe hard core, split the first data into corresponding first data units according to communication identifiers in the first data, transmit the first data units to corresponding first communication modules, obtain corresponding second data units from the first communication modules, merge the second data units into corresponding second data, and transmit the corresponding second data to the upper computer.

Each of the at least one first communication module transmits data to at least one second communication module; the first communication module transmits the first data units to corresponding second communication modules according to the communication identifier.

The second direct memory access control module obtains the first data units from the second communication modules, transmits the first data units to corresponding virtual acceleration applications according to application identifications in the first data units, receives the second data units returned by the virtual acceleration applications, and transmits the second data units to the corresponding second communication modules.

In some embodiments, the virtual device read-write management module includes: a read and split submodule and a merge and write-back submodule;

the read and split submodule splits the first data into the corresponding first data units according to the communication identifiers in the first data, and transmits the first data units to the corresponding first communication modules; and the merge and write-back submodule merges the second data units into the corresponding second data and transmits the corresponding second data to the upper computer.

Alternatively, the virtual device read-write management module further includes a mapping table.

The mapping table includes a correspondence relationship between the communication identifier and the at least one first communication module; and the first data units are transmitted to the corresponding first communication modules according to the mapping table.

Alternatively, the first FPGA further includes a first in first out memory.

The first in first out memory is arranged between the virtual device read-write management module and a data link of each first communication module and is configured to cache the first data units.

Alternatively, the first FPGA further includes a physical data transmission module, a first direct memory access control module, a physical application module, and a physical management module.

The first direct memory access control module obtains the corresponding first data from the PCIe hard core through the physical data transmission module, and transmits the first data to the physical application module for physical acceleration to obtain the corresponding second data, and the second data is then obtained and transmitted to the PCIe hard core through the physical data transmission module.

The physical management module is configured to monitor a state parameter of the heterogeneous acceleration device; and the state parameter includes: a temperature, power consumption, and a voltage.

In response to the heterogeneous acceleration device disabling a virtualization acceleration function, the first FPGA in the heterogeneous acceleration device is configured to include: a PCIe hard core, a third direct memory access control module, a storage controller, a storage read-write management module, and at least one third communication module.

The second FPGA in the heterogeneous acceleration device is configured to include: a fourth communication module at least one physical acceleration application.

The third direct memory access control module obtains the first data from the PCIe hard core, transmits the first data to the storage controller, obtains the second data from the storage controller, and transmits the second data to the PCIe hard core.

The storage read-write management module is configured to: obtain the first data from the storage controller, split the first data into the corresponding first data units according to communication identifiers in the first data, transmit the first data units to corresponding third communication modules, obtain the second data units from the third communication modules, merge the second data units into the corresponding second data, and transmit the corresponding second data to the storage controller.

Each third communication module of the at least one third communication module transmits data to one corresponding fourth communication module; the third communication module transmits the first data units to the corresponding fourth communication module according to the communication identifier.

The fourth communication module transmits the first data units to corresponding physical acceleration applications, receives second data units returned by the physical acceleration applications, and transmits the second data units to the corresponding third communication modules.

In response to the second FPGA including one physical acceleration application, the fourth communication module is in communicative connection with the physical acceleration application.

The fourth communication module transmits the first data units to the physical acceleration application and receives the second data units from the physical acceleration application.

In response to the second FPGA including a plurality of data acceleration applications, the second FPGA further includes a split and merge management module. The split and merge management module obtains the first data units from the fourth communication module, allocates the first data units to corresponding physical acceleration applications according to application identifications of the first data units, obtains the second data units from the physical acceleration applications, and transmits the second data units to the fourth communication module.

In some embodiments, the storage read-write management module includes: a read-out and split submodule and a merge and write-in submodule.

The read-out and split submodule obtains the first data from the storage controller, splits the first data into the corresponding first data units according to the communication identifiers in the first data, and transmits the first data units to the corresponding third communication modules.

The merge and write-in submodule obtains the second data units from the third communication modules, merges the second data units into the corresponding second data, and transmits the corresponding second data to the storage controller.

Alternatively, the first FPGA further includes a data acceleration application.

The data acceleration application obtains the first data units from the read-out and split submodule, performs heterogeneous acceleration on the first data units, and transmits the corresponding second data units to the merge and write-in submodule.

Embodiment III

A heterogeneous acceleration system is provided, including an upper computer and the heterogeneous acceleration device as described in the first aspect.

The upper computer includes: an application driver module and an application interface module.

The application driver module is configured to: configure registers of a virtual acceleration application, a physical acceleration application, and a data acceleration application, and control the virtual acceleration application, the physical acceleration application, and the data acceleration application through the application interface module.

Embodiment IV

A heterogeneous acceleration method is provided, applied to the first FPGA in the heterogeneous acceleration system as described in the second aspect and including:

obtaining first data from the upper computer, where the first data is data that needs to be accelerated by the heterogeneous acceleration device;

splitting the first data into first data units according to communication identifiers in the first data, and transmitting the first data units to corresponding second FPGAs;

obtaining second data units from one or more second FPGAs among the at least one second FPGA, where the second data units are results obtained by processing the first data units through corresponding data acceleration applications; and merging the second data units into second data, and returning the second data to the upper computer.

Further, the transmitting the first data units to corresponding second FPGAs includes:

querying first communication modules corresponding to communication identifiers of the first data units in a mapping table, where the communication identifiers include the first communication modules corresponding to the first data units;

obtaining resource utilization rates of second FPGAs corresponding to the first communication modules; and transmitting the first data units to second FPGAs with lowest resource utilization rates.

Further, the first data units are transmitted to the corresponding first communication modules after being cached through the first in first out memory, and the second data units are transmitted to the virtual device read-write management module after being cached through the first in first out memory.

Further, the merging the second data units into second data includes:

preferentially merging second data units with high service priorities according to service priorities of the second data units.

Embodiment V

A heterogeneous acceleration method is provided, applied to the second FPGA in the heterogeneous acceleration system as described in the second aspect and including:

obtaining a first data unit transmitted by the first FPGA, where the first data unit includes an application identification;

allocating the first data unit to a corresponding virtual acceleration application for acceleration processing according to the application identification, and obtaining a corresponding second data unit, where the second data unit is a result obtained by processing the first data unit through a corresponding data acceleration application; and transmitting the second data unit to the first FPGA through a corresponding second communication module.

Embodiment VI

A heterogeneous acceleration method is provided, applied to the upper computer in the heterogeneous acceleration system as described in the second aspect and including:

activating a single root input/output virtualization function of a driver program, where the driver program is used for driving a virtual acceleration application in a second FPGA;

opening and controlling the virtual acceleration application, storing data that requires heterogeneous acceleration as first data into an internal memory of the upper computer, for the first FPGA to obtain the first data; and obtaining second data returned by the first FPGA, where the second data corresponds to the first data, and is obtained by the following method:

transmitting first data units to corresponding virtual acceleration applications for acceleration processing according to application identifications to obtain corresponding second data units, transmitting the second data units to the first FPGA through corresponding second communication modules, obtaining, by the second FPGA, the second data units corresponding to the first data units, and merging the second data units into the second data.

Further, before the activating a single root input/output virtualization function of a driver program, the method further includes:

in response to a heterogeneous acceleration device enabling a virtualization acceleration function, configuring the first FPGA in the heterogeneous acceleration device to include: a PCIe hard core, a virtual device read-write management module, and at least one first communication module; and configuring the second FPGA in the heterogeneous acceleration device to include: a second communication module, a second direct memory access control module, and at least one virtual acceleration application.

Embodiment VII

A hardware acceleration apparatus is provided, as shown in FIG. 7, including:

an acceleration data obtaining module, configured to obtain first data from an upper computer, where the first data is data that needs to be accelerated by a heterogeneous acceleration device;

a data splitting and transmission module, configured to: split the first data into first data units according to communication identifiers in the first data, and transmit the first data units to corresponding second FPGAs;

a data acquisition module, configured to obtain second data units from one or more second FPGAs among at least one second FPGA, where the second data units are results obtained by processing the first data units through corresponding data acceleration applications; and a data merging module, configured to: merge the second data units into second data, and return the second data to the upper computer.

Embodiment VIII

Figure 8:
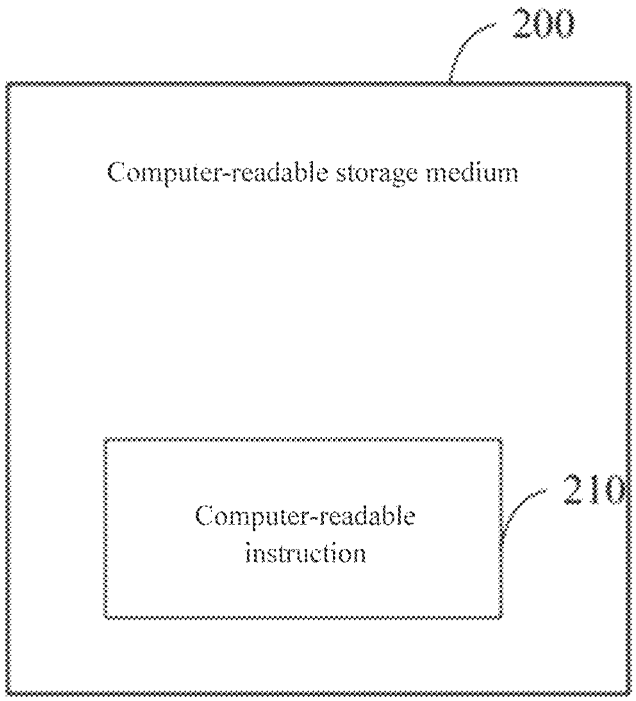
FIG. 8 is a schematic diagram of a computer-readable storage medium according to one or more embodiments of the present application.

One or more non-volatile computer-readable storage media are provided, having a computer-readable instruction stored therein. As shown in FIG. 8, the computer-readable storage media 200 store a computer-readable instruction 210. The computer-readable instruction 210, when executed by one or more processors, implements the heterogeneous acceleration methods as described in Embodiment IV, Embodiment V, and Embodiment VI.

Embodiment IX

Figure 9:
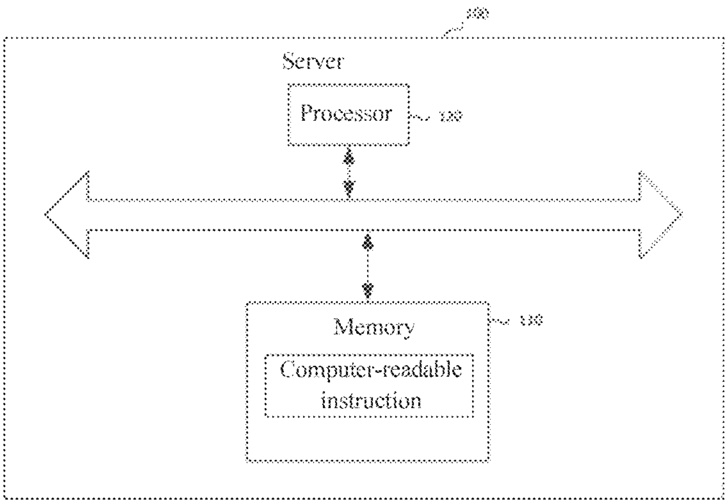
FIG. 9 is a schematic diagram of a server according to one or more embodiments of the present application.

A server is provided. As shown in FIG. 9, a processor 120 and a memory 110 are configured in the server 100. When executing a computer-readable instruction in the memory 110 through the processor 120, the server 100 implements the heterogeneous acceleration methods as described in Embodiment IV, Embodiment V, and Embodiment VI.

Particularly, according to the embodiments of the present application, the process described in the reference flowchart above can be implemented as a computer software program. For example, the embodiments of the present application include a computer-readable instruction product, including a computer-readable instruction carried on a computer-readable medium, and the computer-readable instruction includes program codes for performing the methods shown in the flowcharts. In such an embodiment, the computer-readable instruction may be downloaded and installed from a network through a communication apparatus, or installed from a memory, or installed from a read only memory (ROM). When the computer-readable instruction is executed by an external processor, the above functions defined in the methods disclosed in the embodiments of the present application.

It should be noted that the computer-readable medium of the embodiments of the present application can be a computer-readable signal medium, a computer-readable storage medium, or any combination of the computer-readable signal medium and the computer-readable storage medium. The computer-readable storage medium can be, for example, but not limited to, electric, magnetic, optical, electromagnetic, infrared, or semiconductor systems, apparatuses, or devices, or any combination of the above. More specific examples of the computer-readable storage medium may include, but are not limited to: an electrical connection with one or more wires, a portable computer disk, a hard disk drive, a random access memory (RAM), a ROM, an erasable programmable read only memory (EPROM) or flash memory, an optical fiber, a compact disc read only memory (CD-ROM), an optical storage device, a magnetic storage device, or any suitable combination of the above. In the embodiments of the present application, the computer-readable storage medium may be any tangible medium that contains or stores a program, and the program can be used by or in combination with an instruction execution system, apparatus, or device. In the embodiments of the present application, computer-readable signal media may include data signals propagated in a baseband or as part of a carrier wave, which carries computer-readable program codes. The propagated data signal may be in various forms, including but not limited to an electromagnetic signal, an optical signal, or any suitable combination thereof. The computer-readable signal medium may also be any computer-readable medium other than a computer-readable storage medium. The computer-readable signal medium can send, propagate, or transmit programs for use by or in combination with an instruction execution system, apparatus, or device. The program codes contained in the computer-readable medium can be transmitted using any suitable medium, including but not limited to: a wire, an optical cable, a Radio Frequency (RF), and the like, or any suitable combination of the above.

The computer-readable medium may be included in the above server or exist alone and is not assembled into the server. The above computer-readable medium carries one or more programs, and when the server executes the one or more programs, the server is caused to: in response to detecting that a peripheral mode of a terminal is not activated, obtain a frame rate of an application on the terminal; when the frame rate satisfies a screen-off condition, determine whether a user is obtaining screen information from the terminal; and in response to a determining result that the user has not obtained the screen information of the terminal, control a screen to enter an immediate dim mode.

Computer-readable instruction codes for performing the operations of the embodiments of the present application may be written in one or more programming languages or a combination thereof. The above programming languages include an object-oriented programming language such as Java, Smalltalk, and C++, and conventional procedural programming languages such as "C" language or similar programming languages. The program codes may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a LAN or a WAN, or can be connected to an external computer (for example, through an Internet using an Internet service provider).

The various embodiments in this specification are all described progressively, and the same similar parts between the various embodiments can be referred to each other. Each embodiment focuses on differences from other embodiments. Particularly, the system or system embodiment is basically similar to the method embodiment, and therefore is described briefly. For related parts, refer to some of the descriptions in the method embodiment. The system and the system embodiment described above are only schematic. The units described as separate parts may or may not be physically separate, and parts displayed as units may or may not be physical units, may be located in one position, or may be distributed on a plurality of network units. Some or all of the modules are selected according to actual needs to achieve the objective of the solution of this embodiment. Those of ordinary skill in the art can understand and implement the present application without creative work.

The technical solutions provided by the present application are described in detail above. Specific examples are used herein to illustrate the principles and implementations of the present application. The descriptions of the above embodiments are only used to help understand the method of the present application and its core idea; and at the same time, those of ordinary skill in the art will make changes to all the specific implementations and application scopes according to the idea of the present application. In conclusion, the content of this specification shall not be understood as a limitation on the present disclosure.

The foregoing descriptions are merely alternative embodiments of the present application, but are not intended to limit present application. Any modification, equivalent replacement, or improvement made within the spirit and principle of present application shall fall within the protection scope of the present application.

What is claimed is:

1. A heterogeneous acceleration device, comprising: a first field programmable gate array (FPGA) and at least one second FPGA, wherein the first FPGA is connected to an upper computer through a peripheral component interface express (PCIe) bus and is configured to: receive first data transmitted by the upper computer and return second data to the upper computer; the first data is data that needs to be accelerated by a heterogeneous acceleration device, and the second data is data obtained after acceleration by the heterogeneous acceleration device;

the first FPGA is connected to the at least one second FPGA through a high-speed transmission device and is configured to: transmit corresponding first data units to one or more second FPGAs among the at least one second FPGA and receive second data units returned by the one or more second FPGAs among the at least one second FPGA; any one of the at least one second FPGA has at least one acceleration application; the first data units are obtained by splitting the first data; a data type processed by each acceleration application corresponds to a data type of each first data unit; the second data units are data units obtained after corresponding acceleration applications performs heterogeneous acceleration on the first data units; and the second data is obtained after merging the second data units;

wherein in response to the heterogeneous acceleration device disabling a virtualization acceleration function, the first FPGA in the heterogeneous acceleration device is configured to comprise: a PCIe hard core, a third direct memory access control module, a storage controller, a storage read-write management module, and at least one third communication module;

the at least one second FPGA in the heterogeneous acceleration device is configured to comprise: a fourth communication module and at least one physical acceleration application;

the third direct memory access control module obtains the first data from the PCIe hard core, transmits the first data to the storage controller, obtains the second data from the storage controller, and transmits the second data to the PCIe hard core;

the storage read-write management module is configured to: obtain the first data from the storage controller, split the first data into the corresponding first data units according to communication identifiers in the first data, transmit the first data units to corresponding third communication modules, obtain the second data units from the at least one third communication module, merge the second data units into the corresponding second data, and transmit the corresponding second data to the storage controller;

each of the at least one third communication module transmits data to one corresponding fourth communication module; the third communication module transmits the first data units to the corresponding fourth communication module according to the communication identifier; and the fourth communication module transmits the first data units to corresponding physical acceleration applications, receives second data units returned by the physical acceleration applications, and transmits the second data units to the corresponding third communication modules.

2. The heterogeneous acceleration device according to claim 1, wherein in response to the heterogeneous acceleration device enabling the virtualization acceleration function, the first FPGA in the heterogeneous acceleration device is configured to comprise:

the PCIe hard core, a virtual device read-write management module, and at least one first communication module;

the at least one second FPGA in the heterogeneous acceleration device is configured to comprise: a second communication module, a second direct memory access control module, and at least one virtual acceleration application;

the virtual device read-write management module is configured to: obtain the first data from the PCIe hard core, split the first data into corresponding first data units according to communication identifiers in the first data, transmit the first data units to corresponding first communication modules, obtain corresponding second data units from the at least one first communication module, merge the second data units into corresponding second data, and transmit the corresponding second data to the upper computer;

each of the at least one first communication module transmits data to at least one second communication module; the first communication module transmits the first data units to corresponding second communication modules according to the communication identifier; and the second direct memory access control module obtains the first data units from the at least one second communication module, transmits the first data units to corresponding virtual acceleration applications according to application identifications in the first data units, receives the second data units returned by the virtual acceleration applications, and transmits the second data units to the corresponding second communication modules.

3. The heterogeneous acceleration device according to claim 2, wherein the virtual device read-write management module comprises: a read and split submodule and a merge and write-back submodule;

the read and split submodule splits the first data into the corresponding first data units according to the communication identifiers in the first data, and transmits the first data units to the corresponding first communication modules; and the merge and write-back submodule merges the second data units into the corresponding second data and transmits the corresponding second data to the upper computer.

4. The heterogeneous acceleration device according to claim 2, wherein the virtual device read-write management module further comprises a mapping table;

the mapping table comprises a correspondence relationship between the communication identifiers and the at least one first communication module; and the first data units are transmitted to the corresponding first communication modules according to the mapping table.

5. The heterogeneous acceleration device according to claim 2, wherein the first FPGA further comprises a first in first out memory;

the first in first out memory is arranged between the virtual device read-write management module and a data link of each of the at least one first communication module and is configured to cache the first data units.

6. The heterogeneous acceleration device according to claim 2, wherein the first FPGA further comprises a physical data transmission module, a first direct memory access control module, a physical application module, and a physical management module;

the first direct memory access control module obtains the corresponding first data from the PCIe hard core through the physical data transmission module, and transmits the first data to the physical application module for physical acceleration to obtain the corresponding second data, and the second data is then obtained and transmitted to the PCIe hard core through the physical data transmission module;

the physical management module is configured to monitor a state parameter of the heterogeneous acceleration device; and the state parameter comprises: a temperature, power consumption, and a voltage.

7. The heterogeneous acceleration device according to claim 1, wherein in response to the at least one second FPGA comprising one physical acceleration application, the fourth communication module is in communicative connection with the one physical acceleration application; and the fourth communication module transmits the first data units to the one physical acceleration application and receives the second data units from the one physical acceleration application.

8. The heterogeneous acceleration device according to claim 1, wherein in response to the at least one second FPGA comprising a plurality of data acceleration applications, the at least one second FPGA further comprises a split and merge management module; the split and merge management module obtains the first data units from the fourth communication module, allocates the first data units to corresponding physical acceleration applications according to application identifications of the first data units, obtains the second data units from the physical acceleration applications, and transmits the second data units to the fourth communication module.

9. The heterogeneous acceleration device according to claim 1, wherein the storage read-write management module comprises: a read-out and split submodule and a merge and write-in submodule;

the read-out and split submodule obtains the first data from the storage controller, splits the first data into the corresponding first data units according to the communication identifiers in the first data, and transmits the first data units to the corresponding third communication modules; and the merge and write-in submodule obtains the second data units from the third communication modules, merges the second data units into the corresponding second data, and transmits the corresponding second data to the storage controller.

10. The heterogeneous acceleration device according to claim 9, wherein the first FPGA further comprises a data acceleration application; and the data acceleration application obtains the first data units from the read-out and split submodule, performs heterogeneous acceleration on the first data units, and transmits the corresponding second data units to the merge and write-in submodule.

11. A heterogeneous acceleration system, comprising an upper computer and a heterogeneous acceleration device, wherein the heterogeneous acceleration device comprises a first field programmable gate array (FPGA) and at least one second FPGA, wherein the first FPGA is connected to the upper computer through a peripheral component interface express (PCIe) bus and is configured to: receive first data transmitted by the upper computer and return second data to the upper computer; the first data is data that needs to be accelerated by a heterogeneous acceleration device, and the second data is data obtained after acceleration by the heterogeneous acceleration device; the first FPGA is connected to the at least one second FPGA through a high-speed transmission device and is configured to: transmit corresponding first data units to one or more second FPGAs among the at least one second FPGA and receive second data units returned by the one or more second FPGAs among the at least one second FPGA; any one of the at least one second FPGA has at least one acceleration application; the first data units are obtained by splitting the first data; a data type processed by each acceleration application corresponds to a data type of each first data unit; the second data units are data units obtained after corresponding acceleration applications performs heterogeneous acceleration on the first data units; and the second data is obtained after merging the second data units, wherein in response to the heterogeneous acceleration device disabling a virtualization acceleration function, the first FPGA in the heterogeneous acceleration device is configured to comprise: a PCIe hard core, a third direct memory access control module, a storage controller, a storage read-write management module, and at least one third communication module; the at least one second FPGA in the heterogeneous acceleration device is configured to comprise: a fourth communication module and at least one physical acceleration application; the third direct memory access control module obtains the first data from the PCIe hard core, transmits the first data to the storage controller, obtains the second data from the storage controller, and transmits the second data to the PCIe hard core; the storage read-write management module is configured to: obtain the first data from the storage controller, split the first data into the corresponding first data units according to communication identifiers in the first data, transmit the first data units to corresponding third communication modules, obtain the second data units from the at least one third communication module, merge the second data units into the corresponding second data, and transmit the corresponding second data to the storage controller; each of the at least one third communication module transmits data to one corresponding fourth communication module; the third communication module transmits the first data units to the corresponding fourth communication module according to the communication identifier; and the fourth communication module transmits the first data units to corresponding physical acceleration applications, receives second data units returned by the physical acceleration applications, and transmits the second data units to the corresponding third communication modules, wherein the upper computer comprises: an application driver module and an application interface module;

the application driver module is configured to: configure registers of a virtual acceleration application, a physical acceleration application, and a data acceleration application, and control the virtual acceleration application, the physical acceleration application, and the data acceleration application through the application interface module.

12. A heterogeneous acceleration method, being applied to a first field programmable gate array (FPGA) in a heterogeneous acceleration system comprising a heterogeneous acceleration device wherein the heterogeneous acceleration device comprise the first FPGA and at least one second FPGA, wherein the first FPGA is connected to an upper computer through a peripheral component interface express (PCIe) bus and is configured to:

receive first data transmitted by the upper computer and return second data to the upper computer;

the first data is data that needs to be accelerated by a heterogeneous acceleration device, and the second data is data obtained after acceleration by the heterogeneous acceleration device; the first FPGA is connected to the at least one second FPGA through a high-speed transmission device and is configured to: transmit corresponding first data units to one or more second FPGAs among the at least one second FPGA and receive second data units returned by the one or more second FPGAs among the at least one second FPGA; any one of the at least one second FPGA has at least one acceleration application; the first data units are obtained by splitting the first data; a data type processed by each acceleration application corresponds to a data type of each first data unit; the second data units are data units obtained after corresponding acceleration applications performs heterogeneous acceleration on the first data units; and the second data is obtained after merging the second data units, wherein in response to the heterogeneous acceleration device disabling a virtualization acceleration function, the first FPGA in the heterogeneous acceleration device is configured to comprise: a PCIe hard core, a third direct memory access control module, a storage controller, a storage read-write management module, and at least one third communication module;

the at least one second FPGA in the heterogeneous acceleration device is configured to comprise:

a fourth communication module and at least one physical acceleration application; the third direct memory access control module obtains the first data from the PCIe hard core, transmits the first data to the storage controller, obtains the second data from the storage controller, and transmits the second data to the PCIe hard core; the storage read-write management module is configured to:

obtain the first data from the storage controller, split the first data into the corresponding first data units according to communication identifiers in the first data, transmit the first data units to corresponding third communication modules, obtain the second data units from the at least one third communication module, merge the second data units into the corresponding second data, and transmit the corresponding second data to the storage controller; each of the at least one third communication module transmits data to one corresponding fourth communication module; the third communication module transmits the first data units to the corresponding fourth communication module according to the communication identifier; and the fourth communication module transmits the first data units to corresponding physical acceleration applications, receives second data units returned by the physical acceleration applications, and transmits the second data units to the corresponding third communication modules, the heterogeneous acceleration method comprising:

obtaining the first data from the upper computer;

splitting the first data into the first data units according to communication identifiers in the first data, and transmitting the first data units to corresponding second FPGAs of the at least one second FPGA;

obtaining the second data units from one or more second FPGAs among the at least one second FPGA, wherein the second data units are results obtained by processing the first data units through corresponding data acceleration applications; and merging the second data units into the second data, and returning the second data to the upper computer.

13. The heterogeneous acceleration method according to claim 12, wherein the transmitting the first data units to corresponding second FPGAs comprises:

querying first communication modules corresponding to communication identifiers of the first data units in a mapping table, wherein the communication identifiers comprise the first communication modules corresponding to the first data units;

obtaining resource utilization rates of second FPGAs corresponding to the first communication modules; and transmitting the first data units to second FPGAs with lowest resource utilization rates.

14. The heterogeneous acceleration method according to claim 12, wherein the first data units are transmitted to the corresponding first communication modules after being cached through a first in first out memory; and the second data units are transmitted to a virtual device read-write management module after being cached through the first in first out memory.

15. The heterogeneous acceleration method according to claim 12, wherein the merging the second data units into the second data comprises:

preferentially merging second data units with high service priorities according to service priorities of the second data units.

16. A heterogeneous acceleration method, being applied to the at least one second FPGA in the heterogeneous acceleration system according to claim 11 and comprising:

obtaining a first data unit transmitted by the first FPGA, wherein the first data unit comprises an application identification;

allocating the first data unit to a corresponding virtual acceleration application for acceleration processing according to the application identification, and obtaining a corresponding second data unit, wherein the second data unit is a result obtained by processing the first data unit through a corresponding data acceleration application; and transmitting the second data unit to the first FPGA through a corresponding second communication module.

17. A heterogeneous acceleration method, being applied to the upper computer in the heterogeneous acceleration system according to claim 11 and comprising:

activating a single root input/output virtualization function of a driver program, wherein the driver program is used for driving a virtual acceleration application in a second FPGA of the at least one second FPGA;

opening and controlling the virtual acceleration application, and storing data that requires heterogeneous acceleration as the first data into an internal memory of the upper computer, for the first FPGA to obtain the first data; and obtaining the second data returned by the first FPGA, wherein the second data corresponds to the first data, and is obtained by the following method:

transmitting the first data units to corresponding virtual acceleration applications for acceleration processing according to application identifications to obtain corresponding second data units, transmitting the second data units to the first FPGA through corresponding second communication modules, obtaining, by the at least one second FPGA, the second data units corresponding to the first data units, and merging the second data units into the second data.

18. A non-transitory computer-readable storage media, having a heterogeneous accelerated execution program stored therein, wherein when the heterogeneous accelerated execution program is executed, the heterogeneous acceleration method according to claim 12 is implemented.

19. A server, wherein when the server executes a heterogeneous accelerated execution program, the server implements the heterogeneous acceleration method according to claim 12.

* * * * *